Aug. 25, 1942.  W. H. BASELT  2,294,268
RAILWAY BRAKE
Filed Sept. 8, 1939
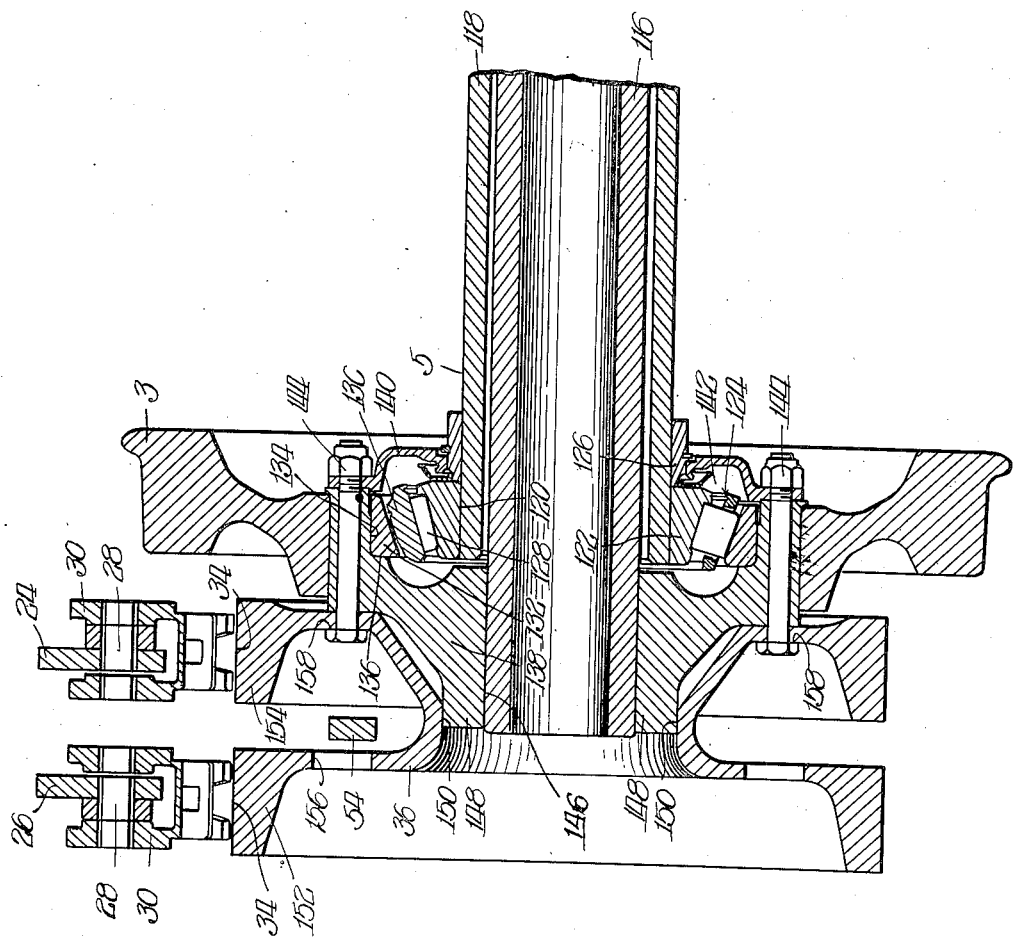
INVENTOR.
Walter H. Baselt,
BY 
ATTORNEY.

Patented Aug. 25, 1942

2,294,268

UNITED STATES PATENT OFFICE 2,294,268

RAILWAY BRAKE

Walter H. Baselt, Chicago, Ill., assignor to American Steel Foundries, Chicago, Ill., a corporation of New Jersey Application September 8, 1939, Serial No. 293,916

8 Claims. (Cl. 188—218)

My invention relates generally to brake equipment for railways and more particularly to an improved means for attaching a brake drum to an associated wheel.

A specific object of my invention is a novel braking arrangement for a railway wheel and axle assembly of such form as to permit the braking surfaces to be mounted outboard the wheels in a manner accessible for inspection and repair as desirable.

A different object of my invention is such a construction as that above contemplated which may be applied to a railway wheel and axle assembly of anti-friction type.

A further object of my invention is a novel design of brake drum rigging wherein the brake drum casting may be pressed upon the outboard hub of an associated wheel and may be seated upon and secured to the outboard face of said wheel.

Still another object of my invention is an arrangement whereby the inboard drum of a brake drum casting comprising a double drum may be secured to a wheel in the manner above-described and whereby access may be had through an opening in the outboard drum to the means securing said casting to said wheel.

With these and other objects in view my invention may consist of certain novel features of construction and operation as will be more fully described and particularly pointed out in the specification, drawing and claims appended hereto.

The single figure is a sectional view of a brake drum as applied to an associated wheel and axle assembly, said view being taken in the transverse vertical plane bisecting said drum and said assembly and showing particularly the relationship between the braking means and said assembly.

The wheel and axle assembly as shown comprises a wheel 3, an inner rotating axle 116, and a normally nonrotating outer axle 118, said outer axle supporting as at 5 a journal bearer for connection to pedestal jaws of a truck frame (not shown). The type and arrangement of said axles constitute no part of my invention, and any type of single or double axle may be used such as is well known in the art. At the end of the outer axle 118 as at 120 may be seated the inner race or cone 122 of the antifriction bearing generally indicated at 124, said cone race being maintained in position by the shrink collar 126. The bearing 124 may comprise a series of antifriction rollers 128, 128 retained in their proper relative positions by the cage or spacer member 130, said rollers riding within the outer race or cup 132 which may be seated as at 134 against the shoulder 136 formed on the wheel hub 138. The closure plate 140 serves to retain lubricant in the bearing cavity 142, and may be secured to the wheel hub member 138 as by a series of threaded bolts 144, 144. The wheel hub member 138 may be press-fitted as at 146 upon the outboard end of the inner axle 116, and said hub member 138 is projected as at 148 to form a seat as at 150 for the drum casting 36 already mentioned. As shown, the drum casting 36 comprises the integrally formed outboard drum 152 and the inboard drum 154 spaced to afford therebetween an annular channel for free circulation of air. The plate member of the outboard drum is cored out as at 156, 156 affording access to the series of securing bolts 144, 144 which may extend through and be seated against the plate member as at 158, 158 of the inboard drum 154.

It is to be understood that I do not wish to be limited by the exact embodiment of the device shown which is merely by way of illustration and not limitation as various and other forms of the device will, of course, be apparent to those skilled in the art without departing from the spirit of the invention or the scope of the claims.

I claim:

1. In a railway brake drum mounting, a wheel comprising an outboard hub and an outboard face, and a brake drum casting comprising a plurality of brake drums pressed upon said hub and joined by an integral web affording an annular seat against said face for securement thereto, said casting presenting a plurality of circumferential braking surfaces.

2. In a brake drum mounting, a wheel comprising a hub and a face, and a brake drum casting comprising a plurality of brake drums presenting circumferentially aligned braking surfaces and having an integral web joining said drums and presenting a plurality of annular seats for securement respectively to said hub and said face.

3. In a wheel and axle assembly, a wheel comprising a face and a hub, and a plurality of brake elements, an integral web joining said elements and having a plurality of annular seats for securement respectively to said face and said hub and having a plurality of circumferential braking surfaces.

4. In a wheel and axle assembly, a wheel having an outboard face and an outboard hub, a brake member outboard said wheel having spaced drums each presenting a circumferential braking surface, and a web joining said drums, said web presenting a plurality of seats for securement respectively against said face and said hub.

5. In a brake drum mounting, brake drums having peripheral braking surfaces, a web joining said drums, and a wheel comprising a face and a hub affording seats thereon for said web.

6. In a brake drum mounting, a wheel comprising a hub and a face, a plurality of brake drums pressed on said hub, and a member joining said drums and seated on said face.

7. In a brake drum mounting, a wheel comprising a face and a hub, a brake member outboard said wheel having spaced inboard and outboard drums, a web joining said drums and presenting a plurality of seats for securement respectively against said face and said hub, aligned openings in said drums and said wheel, and securing means extending through the openings in said inboard drum and said wheel, the openings in said outboard drum affording access to said means.

8. In a brake drum mounting, a brake member comprising a plurality of drums, a web joining said drums, a wheel comprising a face and a hub with seats thereon for said web, means securing said web to said seats, and means in one of said drums affording access to said first-mentioned means.

WALTER H. BASELT.